United States Patent [19]

DeWitt

[11] Patent Number: 4,950,751
[45] Date of Patent: Aug. 21, 1990

[54] METHOD OF ISOLATING ARABINOGALACTAN FROM LARCH

[75] Inventor: Jill E. DeWitt, Raytown, Mo.

[73] Assignee: The Nanci Corporation International, Tulsa, Okla.

[21] Appl. No.: 360,378

[22] Filed: Jun. 2, 1989

[51] Int. Cl.$^5$ .......................... C07H 1/00; C08B 37/00
[52] U.S. Cl. ...................................... 536/128; 536/1.1; 536/124; 204/157.62; 204/157.68
[58] Field of Search ......................... 536/128, 1.1, 124; 204/157.62, 157.68

[56] References Cited

U.S. PATENT DOCUMENTS

| | | | |
|---|---|---|---|
| 2,073,616 | 3/1937 | Acree | 536/1.1 |
| 2,541,058 | 2/1951 | Heritage et al. | 530/500 |
| 2,541,059 | 2/1951 | Heritage et al. | 530/500 |
| 2,697,701 | 12/1954 | Heritage et al. | 536/128 |
| 2,697,702 | 12/1954 | Heritage et al. | 536/128 |
| 2,697,703 | 12/1954 | Heritage et al. | 536/128 |
| 2,701,255 | 2/1955 | Heritage et al. | 530/500 |
| 2,766,881 | 10/1956 | Westervelt et al. | 209/138 |
| 2,818,357 | 12/1957 | Ziegler et al. | 536/103 |
| 3,264,114 | 8/1966 | Glicksman et al. | 426/102 |
| 3,294,544 | 12/1966 | Stanko . | |
| 3,325,473 | 6/1967 | Herrick et al. | 536/127 |
| 3,337,526 | 10/1965 | Adams | 536/128 |
| 3,443,957 | 5/1969 | Segel et al. | 426/324 |
| 3,505,214 | 4/1970 | Bodine | 210/748 |
| 3,509,126 | 4/1970 | Dahl | 536/2 |
| 3,677,818 | 7/1972 | Casebier et al. | 530/507 |
| 3,737,322 | 6/1973 | Frey | 426/658 |
| 3,738,843 | 6/1973 | Frey | 426/573 |
| 3,784,408 | 1/1974 | Jaffe et al. | 530/500 |
| 4,039,456 | 8/1977 | Stoev et al. | 210/388 |
| 4,055,491 | 10/1977 | Porath-Furedi | 210/738 |
| 4,280,823 | 7/1981 | Szonntagh | 210/748 |
| 4,484,012 | 11/1984 | Stahl et al. | 536/124 |
| 4,505,757 | 3/1985 | Kojima et al. | 536/124 |
| 4,508,745 | 4/1985 | Fulger et al. | 426/594 |
| 4,516,566 | 5/1985 | Chao et al. | 536/127 |
| 4,549,947 | 10/1985 | Inoue et al. | 204/182.2 |
| 4,561,953 | 12/1985 | Muralidhara et al. | 204/157.42 |
| 4,591,388 | 5/1986 | Chao et al. | 127/37 |
| 4,673,512 | 6/1987 | Schram | 204/157.15 |
| 4,677,198 | 6/1987 | Linnett | 536/1.1 |
| 4,743,361 | 5/1988 | Schram | 209/1 |
| 4,747,920 | 5/1988 | Muralidhara et al. | 204/157.42 |
| 4,759,775 | 7/1988 | Peterson et al. | 210/188 |
| 4,780,212 | 10/1988 | Kost et al. | 204/152 |
| 4,798,730 | 1/1989 | Scoville et al. | 426/432 |

FOREIGN PATENT DOCUMENTS 740407  8/1966  Canada .

Primary Examiner—Ronald W. Griffin
Assistant Examiner—Everett White
Attorney, Agent, or Firm—Hovey, Williams, Timmons & Collins

[57] ABSTRACT

An improved method for the extraction of galactans, and especially arabinogalactan, is provided which involves application of sonic energy to a mixture of galactan-containing starting material and extraction medium. Preferably, the method involves providing a mixture of Western larch chips and water, and subjecting this mixture to an acoustic or ultrasonic field for enhancing galactan recovery.

11 Claims, No Drawings

METHOD OF ISOLATING ARABINOGALACTAN FROM LARCH

BACKGROUND OF THE INVENTION

1. Field of the Invention

The present invention is broadly concerned with an improved process for the extraction of galactans from sources thereof using sonic energy. More particularly it is concerned with such a process which in preferred forms involves subjecting a mixture of Western larch chips and aqueous solvents to an acoustic field in order to enhance the recovery of arabinogalactan.

2. Description of the Prior Art

Arabinogalactan is a polysaccharide made up of galactose and arabinose units in the ratio of approximately five or six to one. Arabinogalactan is found in abundance, for example, in the wood of the Western larch tree (*Larix occidentalis*). While the arabinogalactan is present throughout the tree, the lower portion of the trunk, referred to as the "butt cut" contains so much arabinogalactan, of the order of 15% to 25% and more of the weight of the dry log, that the butt cut is neither good for lumber nor for pulping purposes. For years this portion of the tree has been discarded and left in the forest.

U.S. Pat. No. 2,073,616 describes a process for extracting arabinogalactan from larch wood wherein wood chips are subjected to leaching by an aqueous solvent which may contain dilute acid or alkali. This basic process has been followed in the industry for the last half-century without appreciable change, although there have been proposals for downstream purification of the arabinogalactan product.

The water extraction process for recovering arabinogalactan from larch is inherently expensive inasmuch as the process is generally capable of recovering only a relatively small fraction of the arabinogalactan present in the starting material. As a consequence, arabinogalactan has remained as expensive material, which has drastically limited its commercial usefulness.

It would therefore be a decided boon in the art to provide a method which would materially enhance arabinogalactan recovery without undue additional expense or difficulty; such a breakthrough would open up many new markets for the desirable arabinogalactan end product.

SUMMARY OF THE INVENTION

The present invention overcomes the difficulties noted above and provides an improved process for the extraction of galactans, and particularly arabinogalactan, from starting materials such as Western larch. Broadly speaking, the method of the invention constitutes an improvement over the conventional aqueous extraction technique, in that use is made of sonic energy for enhancing the extraction of galactans.

In more detail, the method of the invention comprises the steps of providing solid particles of a source containing galactans, forming a mixture of the particles and a liquid extraction medium for the galactans, and subjecting this mixture to sonic energy whereupon enhanced quantities of galactans may be recovered. The preferred method involves use of an acoustical or ultrasonic field having a frequency of about 10,000 to 100,000 Hertz, more preferably from about 30,000 to 60,000 Hertz.

When Western larch is used as the starting material, the wood should be subdivided into chips, preferably having an average length of from about ¾ to 1¼ inches, and an average width of from about ¼ to 1 inch. The extraction medium is preferably aqueous but may include acid or alkali or organic solvents such as dimethylsulfoxide (DMSO), and is used at a level such that the ratio of particles to extraction medium varies from about 1:3 to 1:8, more preferably from about 1:4 to 1:6.

The extraction step involves subjecting the mixture to the sonic energy for a period of at least two hours, and more preferably from about 12 to 72 hours. The medium is advantageously extracted at ambient temperature, but if desired it may be moderately heated, typically up to a maximum of about 170° F. The mixture may be maintained in a quiescent state during the extracting step, apart from the application of an acoustical field. Alternately, the fluid medium may be continuously or intermittently recirculated through the chips during sonic treatment.

While use of Westerrn larch is normally preferred because of the high content or arabinogalactan therein, virtually any source of this material may be employed, e.g., mesquite gum, cherry gum, peach gum, rye and wheat bran, beet pulps, coffee and the wood of coniferous trees. In addition, while recovery of arabinogalactans is conventional (typically involving simple evaporation to dryness), if desired more refined purification techniques may be employed, such as the use of methyl alcohol and water or magnesium oxide.

Actual experiments using the method of the invention demonstrate that galactan production may be increased substantially, on the order of 20%, using only water as an extraction medium, and with simple evaporation being the sole purification technique.

DESCRIPTION OF THE PREFERRED EMBODIMENTS

The following Example sets forth a series of tests comparing the methods of the present invention and conventional extraction techniques. It is to be understood that the Example is provided for purpose of illustration only, and should not be viewed in a limiting sense.

EXAMPLE 50 grams of Western larch chips were mixed with 250 ml. of water (25° C.) in a high frequency bath apparatus (Model 1 CONX, Connoisseur Products Corp. Sommerville, MA., U.S. Pat. No. D 281,539). The mixture was treated using sonic energy for 24 hours in the bath apparatus.

The supernatant liquid was then decanted from the chips and filtered using a Buchner funnel to remove fines and loose partices. The liquid filtrate was then collected.

A second extraction was performed by adding 200 ml. of fresh water to the chips, followed by an additional 24 hour ultrasound treatment and filtrate collection.

A final extraction was performed in a manner identical to the second extraction, giving a total of three liquid filtrate samples.

Three controls were also run under identical conditions except that no sonic energy was employed. In two of the controls, only a single filtrate sample was collected, whereas one control involved three separate filtrate collections.

The liquid samples were all evaporated to dryness and weighed using a Buchi rotary evaporator operated at 0.3 microns pressure, water bath temperature 51° C.

The result of a series of tests carried out as described above are set forth below:

| SAMPLE NO. | LIQUID FILTRATE RECOVERED (ml) | SOLIDS RECOVERED (g.) | % GALACTAN RECOVERED |
|---|---|---|---|
| Control 1 | 178 | 1.39 | 3.9 |
| Control 2 | 192 | 1.33 | 3.5 |
| Control 3 | | | |
| 1st Extract | 188 | 1.22 | 3.2 |
| 2nd Extract | 176 | 0.54 | 1.5 |
| 3rd Extract | 190 | 0.24 | 0.6 |
| TOTAL | | | 5.3 |
| RUN A | | | |
| 1st Extract | 150 | 1.50 | 5.0 |
| 2nd Extract | 165 | 0.58 | 1.7 |
| 3rd Extract | 178 | 0.29 | 0.8 |
| TOTAL | | | 7.54 |
| RUN B | | | |
| 1st Extract | 158 | 1.66 | 5.2 |
| 2nd Extract | 170 | 0.61 | 1.8 |
| 3rd Extract | — | — | — |
| TOTAL | | | 7.0 |

These tests demonstrate that arabinogalactan production may be substantially increased through use of the method of the present invention.

I claim:

1. In a method of extracting galactans from a source thereof including the steps of providing a quantity of solid particles of said source, forming a mixture of said particles and liquid extraction medium for said galactans, and recovering extracted galactans, the improvement which comprises subjecting said mixture to an effective amount of sonic energy for enhancing the extraction of said galactans from said source particles.

2. The method of claim 1, said mixture being subjected to an acoustic field.

3. The method of claim 1, said particles comprising Western larch chips.

4. The method of claim 3, said chips having an average length of from about ¾ to 1¼ inch, and an average width of from about ¾ to 1 inch.

5. The method of claim 1, said medium being aqueous.

6. The method of claim 1, said mixture having a weight ratio of particles to medium of from about 1:3 to 1:8.

7. The method of claim 1, said recovered galactan being primarily arabinogalactan.

8. The method of claim 1, including the step of maintaining said mixture at a temperature of from about ambient to 170° 1 F.

9. The method of claim 1, said mixture being subjected to a field having a frequency of from about 20,000 to 100,000 Hertz.

10. The method of claim 1, including the step of subjecting said mixture to said vibratory energy for a period of at least about two hours.

11. The method of claim 10, said period being from about 12 to 72 hours.

* * * * *